United States Patent Office 3,281,680
Patented Oct. 25, 1966

3,281,680
CALIBRATOR FOR USE WITH A MAGNETIC RESONANCE SPECTROMETER
Eric Andrew Faulkner, Reading, England, assignor to National Research Development Corporation, London, England, a British corporation
Filed Feb. 1, 1963, Ser. No. 255,557
Claims priority, application Great Britain, Feb. 6, 1962, 4,596/62
5 Claims. (Cl. 324—58)

This invention relates to microwave magnetic resonance spectrometers and is concerned with providing a calibrator for use therewith.

In a microwave magnetic resonance spectrometer microwave energy and additionally a unidirectional magnetic field which is modulated cyclically are applied to a resonant cavity containing a specimen of material and the magnetic susceptibility of the specimen and thus the response of the cavity changes at a particular relationship between the magnitude of the magnetic field and the frequency of the applied microwave energy due to electron spin resonance phenomena, and this change is indicative of the nature of the specimen. In practice the unidirectional modulated magnetic field has a slow time sweep superimposed thereon and the microwave energisation is maintained at a constant amplitude and frequency. The consequent variation in the resistive or reactive component of the impedance of the cavity is then measured to give the corresponding change in the absorptive or dispersive component of the susceptibility of the specimen.

It is desirable to compare the specimens of different materials without the necessity to allow for changes in the circuit parameters of the spectrometer. While a known specimen mounted permanently in the cavity can be utilised to give a reference it will be appreciated that this is not usually convenient. It is accordingly an object of the invention to provide a circuit which produces a reference output from a spectrometer.

According to the invention a calibrator circuit for use with a microwave magnetic resonance spectrometer comprises means for coupling a small fraction of the microwave energy which is fed to a cavity for containing a specimen to a crystal detector to which is applied a signal at the modulation frequency of the magnetic field applied to the cavity so that microwave energy reflected by the crystal is modulated at said modulation frequency.

In one form of the invention the cavity is provided with means for coupling a small fraction of the energy resonant therein to the crystal.

In an alternative form of the invention means are provided for coupling a small fraction of the input energy of the cavity to the crystal.

Figure 1:
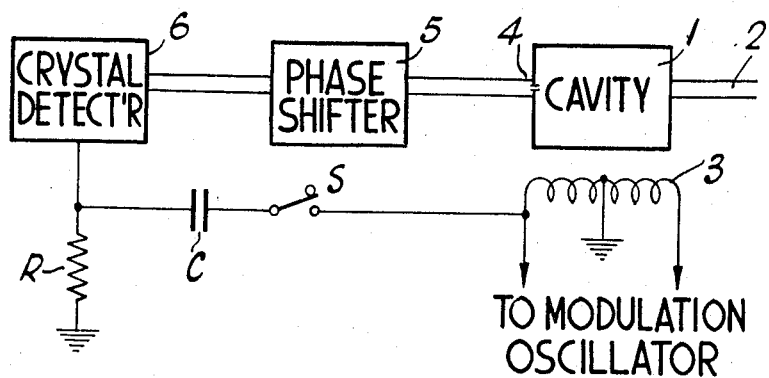
Figure 2:
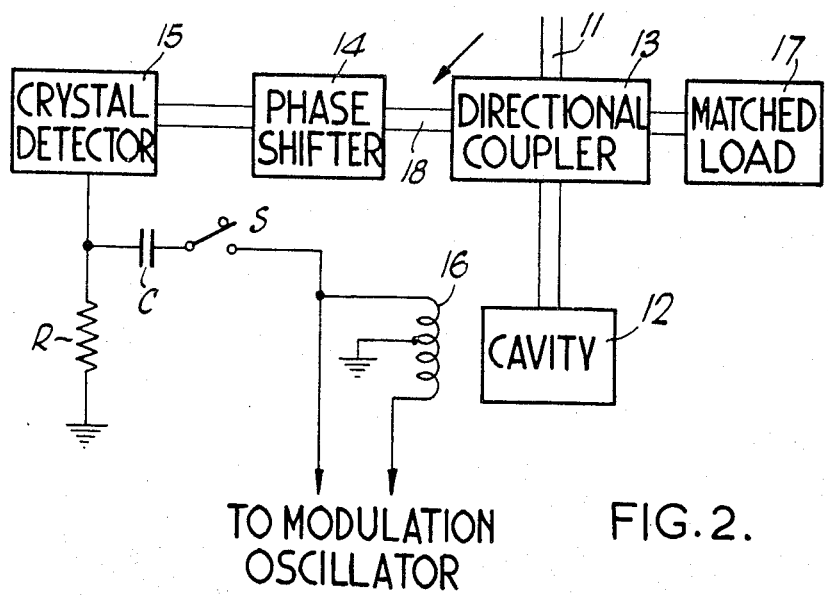

In order that the invention may be more fully understood reference will now be made to the drawing accompanying this specification, in which FIG. 1 and FIG. 2 show alternative embodiments therein.

Referring now to FIG. 1 there is shown therein a resonant cavity 1 arranged to contain a specimen of material and which is supplied with microwave energy from an input wave guide 2. The cavity is arranged to be subjected to a magnetic field provided by a modulation coil 3 which is supplied with current from a modulation oscillator (not shown). Due to electron spin resonance phenomena in a specimen in the cavity the microwave resonant properties of the cavity will be modulated to cause a modulation in the reflected energy from the cavity back along wave guide 2 which can be indicated by a suitable detector arrangement (not shown).

In order to provide a standard value of modulation from the cavity with which the modulation due to a specimen can be compared a small proportion of the energy within the cavity is coupled through a loose coupling 4 and a phase-shifter 5 to a crystal detector 6. The output terminal of crystal detector 6 is connected through a resistor R to earth and is also connected through a capacitor C and switch S to one end of the modulation coil 3.

With such an arrangement when switch S is open and a specimen is in the cavity there will only be a constant minor loss of energy through the loose coupling 4.

When switch S is closed then the crystal detector 6 will carry a proportion of the current shunted from modulation coil 3 and this will cause energy reflected from crystal detector 6 to be modulated at the frequency of energisation of coil 3. Depending on the setting of phase-shifter 5 this is equivalent to a loss of reactance within cavity 1 which varies at the modulation frequency in exactly the same way as the loss or reactance of the cavity due to magnetic resonance in a specimen. Furthermore since the impedance of modulation coil 3 is inductive the reactance of the capacitor C causes the modulation current through the crystal to be in phase with the main modulation current so that the phase of the reference absorption is the same as that of the absorption in a specimen. Where the impedance of coil 3 is not inductive an adjustable phase-shifting network will be required.

The arrangement can conveniently be used as an intermediate standard by occasionally comparing the output from a calibrator with an output from a known specimen. In the intervals between such comparisons the output from any unknown specimen obtained with switch S open can then be compared with the reference output obtained when switch S is closed.

In cases where it is not possible to provide an extra coupling 4 to the cavity as shown in FIG. 1 the arrangement of FIG. 2 can be used. In this arrangement the input wave guide 11 to the resonant cavity 12 includes a directional coupler 13 which can conveniently be a 40 db coupler. Accordingly, the major proportion of the input energy passes to the cavity 12 while a minor proportion is reflected into a side wave guide path 18 and passes through a phase-shifter 14 to a crystal detector 15. This crystal detector 15 includes a load resistor R as in FIG. 1 and is also connected in like manner through a capcitor C and switch S to one end of modulation coils 16 of cavity 12 which, in like manner to the modulation coil 3 illustrated in FIG. 1, is connected to a modulation oscillator.

The operation of this circuit is broadly similar to the arrangement of FIG. 1. When switch S is open the effect of the additional components is to introduce a constant small loss. When switch S is closed the crystal detector 15 reflects energy which is modulated at the modulation frequency and accordingly a reference output signal will be obtained from the spectrometer. In this arrangement instead of the varying loss or reactance appearing to come from within the cavity as in FIG. 1, it appears to come from in front of the cavity and may be considered as the equivalent of a further miniature cavity.

I claim:
1. A microwave magnetic resonance spectrometer having a cavity for containing a specimen, means for supplying microwave energy to the cavity and means for applying a modulated magnetic field to the cavity in which a calibrator circuit is provided comprising a crystal detector, connection means for feeding a small fraction of the microwave energy to said detector and means for applying a signal to said detector at the modulation frequency of said magnetic field to cause the detector to reflect microwave energy modulated at said modulation frequency.

2. A microwave magnetic resonance spectrometer having a cavity for containing a specimen, means for feeding microwave energy to the cavity and means for applying a modulated magnetic field to the cavity in which a calibrator circuit is provided comprising a crystal detector, coupling means for coupling a small fraction of the microwave energy within the cavity to said detector and means for applying a signal to said detector at the modulation frequency of said magnetic field to cause said detector to reflect microwave energy modulated at said modulation frequency.

3. The spectrometer as claimed in claim 2 in which said coupling means comprises a coupling aperture in the cavity.

4. A microwave magnetic resonance spectrometer having a cavity for containing a specimen, means for feeding microwave energy to the cavity and means for applying a modulated magnetic field to the cavity in which a calibrator circuit is provided comprising a crystal detector, means for bleeding a small fraction of the input energy fed towards the cavity to said detector and means for applying a signal to said detector at the modulation frequency of said magnetic field to cause said detector to reflect microwave energy modulated at said modulation frequency.

5. The spectrometer as claimed in claim 4 in which said bleeding means comprises a directional coupler positioned in the input path to the cavity.

References Cited by the Examiner
UNITED STATES PATENTS

| | | | |
|---|---|---|---|
| 3,110,858 | 11/1963 | Arnold | 324—58.5 X |
| 3,113,263 | 12/1963 | Collins | 324—58.5 X |

WALTER L. CARLSON, *Primary Examiner.*

A. E. RICHMOND, *Assistant Examiner.*